Patented May 2, 1939

2,156,446

UNITED STATES PATENT OFFICE 2,156,446

PRODUCTION OF AZO DYESTUFFS

Bernd v. Bock, Ludwigshafen-on-the-Rhine, Germany, assignor to General Aniline Works, Inc., New York, N. Y., a corporation of Delaware No Drawing. Application September 13, 1935, Serial No. 40,407. In Germany September 22, 1934

8 Claims. (Cl. 260—205)

The present invention relates to the production of azo dyestuffs.

I have found that valuable monoazo dyestuffs are obtained by coupling diazotized 1-amino-6-cyano-2,4-dinitrobenzene with amines of the benzene series which are free from sulphonic and carboxylic groups. The monoazo dyestuffs thus prepared are eminently suitable for dyeing cellulose esters and ethers. When suitable coupling components are selected, the dyestuffs yield clear blue dyeings which have, in addition to good fastness to light, the important property of being capable of being discharged white.

The 1-amino-6-cyano-2,4-dinitrobenzene to be employed as initial material according to this invention may be obtained for example by diazotizing ortho-anisidine and reacting the product with potassium cyanide by the Sandmeyer method to form 1-methoxy-2-cyanobenzene. The latter compound then nitrated so that 1-methoxy-2,4-dinitro-6-cyanobenzene is formed and the methoxy group is exchanged for an amino group by treatment with ammonia. The initial material may also be an ortho-halogenaniline instead of ortho-anisidine.

Aniline, meta-toluidine, methylaniline, methylethylaniline, dimethyl-meta-toluidine, omega-cyano-ethyl-meta-toluidine, ethyl-omega-cyano-ethylaniline are, for example, suitable as coupling components. It is of special advantage to employ as coupling components hydroxyalkylated amines, as for example N,N-dihydroxyethyl-meta-toluidine, N-hydroxy-ethyl-N-butyl-meta-toluidine, N,N-dihydroxyethyl-4-methoxy-3-aminotoluene or N-hydroxyethyl-N-(omega-cyano-ethyl)-meta-toluidine.

The dyestuffs thus obtainable dye cellulose esters and ethers red to greenish blue shades. The dyestuffs are generally speaking distinguished by excellent fastness to light and capacity for being discharged a pure white.

The following examples will further illustrate how the present invention may be carried out in practice, but the invention is not restricted to these examples. The parts are by weight.

Example 1

208 parts of 1-amino-6-cyano-2,4-dinitrobenzene are stirred while cooling into 700 parts of concentrated sulphuric acid and diazotized after about half an hour with 280 parts of nitrosylsulphuric acid containing 69 parts of sodium nitrite. The diazo solution is then added while cooling and stirring vigorously to a solution of 219 parts of N-hydroxyethyl-N-normal-butyl-meta-toluidine in 125 parts of 35 per cent hydrochloric acid and 20,000 parts of water. The coupling is immediately completed. The whole is stirred for another twelve hours and the dyestuff formed is then filtered off. It dyes acetate artificial silk very powerful blue shades. The dyeing is capable of being discharged a pure white and is very fast to light. The dyestuff dissolves readily in solutions of nitro-cellulose lacquers and the resulting solutions yield intense blue coatings.

If 206 parts of N,N-dihydroxyethyl-meta-toluidine be employed instead of N-hydroxyethyl-N-butyl-meta-toluidine under otherwise identical conditions, a dyestuff is obtained which also dyes acetate artificial silk and nitrocellulose lacquers powerful blue shades; the shade of color is a little more reddish than that of the first-mentioned dyestuff.

Example 2

The diazo compound of 1-amino-6-cyano-2,4-dinitrobenzene is coupled as described in Example 1 with 154 parts of N-methyl-N-ethylaniline or 168 parts of N-methyl-N-ethyl-meta-toluidine. Dyestuffs are obtained which dye acetate artificial silk and cellulose ester lacquers violet or blue shades.

Example 3

The diazo compound of 1-amino-6-cyano-2,4-dinitrobenzene described in Example 1 is coupled with 214 parts of N-hydroxyethyl-N-(omega-cyano-ethyl)-meta-toluidine. A dyestuff is obtained which dyes acetate artificial silk powerful violet shades.

By employing 226 parts of N-normal-butyl-N-(omega-cyano-ethyl)-meta-toluidine as the coupling component, a dyestuff having similar properties is obtained.

Example 4

The diazo compound of 1-amino-6-cyano-2,4-dinitrobenzene is coupled with 113 parts of meta-toluidine in the manner described in Example 1. A dyestuff is obtained which dyes acetate artificial silk ruby red shades. The dyestuff may be further diazotized on the fibre and violet shades may then be obtained by coupling with beta-naphthol or beta-hydroxynaphthoic acid.

What I claim is:

1. The azo dyestuffs prepared from diazotized 1-amino-6-cyano-2,4-dinitrobenzene and a coupling component selected from the group consisting of N-hydroxyethyl-N-normal-butyl-metatoluidine, ethyl-ω-cyanethylaniline and N-dihydroxyethyl-meta-toluidine.

2. The process of producing azo dyestuffs which comprises coupling diazotized 1-amino-6-cyano-2,4-dinitrobenzene with a coupling component selected from the group consisting of N-hydroxy-ethyl-N-normal-butyl-meta-toluidine, ethyl-ω-cyanethyl-aniline and N-dihydroxyethyl-meta-toluidine.

3. The azo dyestuff prepared from diazotized 1-amino-6-cyano-2,4-dinitrobenzene and N-hydroxyethyl-N-normal-butyl-meta-toluidine.

4. The process of producing azo dyestuffs which comprises coupling diazotized 1-amino-6-cyano-2,4-dinitrobenzene with N-hydroxyethyl-N-normal-butyl-meta-toluidine.

5. The azo dyestuff prepared from diazotized 1-amino-6-cyano-2,4-dinitrobenzene and ethyl-ω-cyanethylaniline.

6. The process of producing azo dyestuffs which comprises coupling diazotized 1-amino-6-cyano-2,4-dinitrobenzene with ethyl-ω-cyanethylaniline.

7. The azo dyestuff prepared from diazotized 1-amino-6-cyano-2,4-dinitrobenzene and N-dihydroxyethyl-meta-toluidine.

8. The process of producing azo dyestuffs which comprises coupling diazotized 1-amino-6-cyano-2,4-dinitrobenzene with N-dihydroxyethyl-meta-toludine.

BERND v. BOCK.